US009499260B2

United States Patent
Christensen et al.

(10) Patent No.: US 9,499,260 B2
(45) Date of Patent: Nov. 22, 2016

(54) AIRCRAFT LANDING GEAR WHEEL WITH INTEGRAL GEAR DRIVE

(71) Applicant: HONEYWELL INTERNATIONAL INC., Morristown, NJ (US)

(72) Inventors: Donald Jeffrey Christensen, Phoenix, AZ (US); Robert Mitchell, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 210 days.

(21) Appl. No.: 14/514,261

(22) Filed: Oct. 14, 2014

(65) Prior Publication Data

US 2016/0229529 A1 Aug. 11, 2016

(51) Int. Cl.
*B64C 25/34* (2006.01)
*B64C 25/40* (2006.01)

(52) U.S. Cl.
CPC .................................. *B64C 25/405* (2013.01)

(58) Field of Classification Search
CPC ............ B64C 25/405; B60B 27/0015; B60B 27/0047
See application file for complete search history.

(56) References Cited

U.S. PATENT DOCUMENTS

| 6,902,507 | B2 | 6/2005 | Ballard | |
|---|---|---|---|---|
| 9,211,948 | B2* | 12/2015 | Osman | B64C 25/405 |
| 9,359,068 | B2* | 6/2016 | Oswald | B64C 25/405 |
| 2014/0225421 | A1* | 8/2014 | Oswald | B64C 25/405 301/6.2 |
| 2014/0245853 | A1* | 9/2014 | Didey | B64C 25/405 74/421 A |
| 2014/0246539 | A1* | 9/2014 | Didey | B64C 25/405 244/50 |
| 2014/0284421 | A1* | 9/2014 | Osman | B64C 25/405 244/50 |
| 2015/0210384 | A1* | 7/2015 | Geck | B64C 25/405 244/50 |
| 2015/0210385 | A1* | 7/2015 | Didey | B64C 25/405 244/50 |
| 2015/0323019 | A1* | 11/2015 | Bedarrides | B64C 25/405 244/50 |

FOREIGN PATENT DOCUMENTS

| EP | 2783980 A2 | 10/2014 | |
|---|---|---|---|
| GB | 2523847 A * | 9/2015 | B64C 25/405 |
| GB | 2524091 A * | 9/2015 | B64C 25/405 |
| GB | 2524097 A * | 9/2015 | B64C 25/405 |
| WO | 2012171589 A1 | 12/2012 | |
| WO | 2014023941 A1 | 2/2014 | |
| WO | WO 2014023939 A1 * | 2/2014 | B64C 25/405 |
| WO | WO2014023941 A1 | 2/2014 | |

OTHER PUBLICATIONS

Hong Ling Hou, Wei Hong Gao; Design of New Chain Transmission and Automatic Meshing Installation; Applied Mechanics and Materials, vol. 442; Oct. 2013; Abstract and First Page of Article from website: http://www.scientific.net/AMM.442.264.
Precision Rotary Motion product information from website: http://nexengroup.com; Copyright 2014.
Extended European Search Report issued on Feb. 23, 2016 for EP application No. 15188827.8.

* cited by examiner

*Primary Examiner* — Joseph W Sanderson
(74) *Attorney, Agent, or Firm* — Shimokaji IP (57) ABSTRACT

An aircraft landing gear wheel is disclosed. A main body includes a hub portion with a gear end and an attachment end. A driven gear portion includes a first annular rail and a second annular rail, the driven gear portion being integrally and drivingly connected with the hub portion at the gear end. Rollers are rotatingly connected between roller apertures of the first annular rail and the second annular rail. Bearings rotatingly support portions of the rollers within the roller apertures.

17 Claims, 7 Drawing Sheets

AIRCRAFT LANDING GEAR WHEEL WITH INTEGRAL GEAR DRIVE

BACKGROUND OF THE INVENTION

The present invention generally relates to wheels of landing gear assemblies, of aircraft with electric drive taxi systems (ETSs).

ETSs powered by auxiliary power units (APUs) may now provide motive power for an increasing number of aircraft when the aircraft are taxiing from landing to the gate, and from the gate to the runway for takeoff. The ETS may provide the motive power as an alternative to motive power traditionally provided by a combination of aircraft main engines and separate carts. As ETSs are utilized for motive power in an increased number of taxis, for increasing distances, and for increased hours, it may be desirous to design components and systems to withstand greater stresses for greater periods of time to provide needed reliability and longer periods of time between needed repairs and maintenance.

The ETS may include a drive interface at an aircraft wheel to allow the wheel to be powered by an electric motor, powered by the APU. Traditionally, a driven gear may be attached to the wheel and a driving gear powered by the electric motor may be moved in and out of a driving connection with the driven gear. The driven gear and driving gear may be formed of a high strength steel to withstand stresses, as torque is transferred between them. The wheel to which the driven gear is attached may be formed of an aluminum alloy or different metal or material than the driven and driving gears. The wheel and driven gear may be attached with bolts or other attachment devices or methods.

The wheel and attached driven gear may be subject, regularly, to large changes in temperature, for example between heated brakes after landing and minus sixty-five degrees Fahrenheit (−65° F.) during flight. The differences in the expansion and contraction characteristics of the materials of the wheel and driven gear may create stresses at the interface between the wheel and the driven gear. In addition, differences in the flexibility characteristics of the materials of the wheel and the driven gear when the ETS provides motive power to the aircraft may also cause stresses at the interface between the wheel and the driven gear. As ETS is used for a larger percentage of aircraft taxiing, these stresses on the wheel and driven gear may cause wear or damage, and lead to less than desirous maintenance intervals for the landing gear.

Aircraft may have a weight limit on total aircraft and cargo weights. When high strength steel is used to form the driven gear, this may add to the aircraft weight and thus lessen the weight of cargo the aircraft is able to carry.

As can be seen, there may be an ongoing need to minimize stresses on aircraft wheels and driven gears, and in particular the interface between the wheel and the driven gear, and maximize maintenance intervals.

SUMMARY OF THE INVENTION

In one aspect of the present invention, an aircraft landing gear wheel, comprises a main body, comprising a hub portion including a gear end and an attachment end; and a driven gear portion integrally and drivingly connected with the hub portion at the gear end.

In another aspect of the present invention, an aircraft landing gear assembly comprises a wheel comprising a main body, and one or more rollers; the main body comprising a hub portion including a gear end and an attachment end, and a driven gear portion integrally and drivingly connected with the hub portion at the gear end; the driven gear portion comprising a first annular stiff rail and a second annular stiff rail; the one or more rollers rotatingly connected between the first annular stiff rail and a second annular stiff rail; a tire mounted on the hub portion; an electric motor assembly including a driving gear, and an electric motor drivingly connected to the driving gear; and an actuator disposed to move the driving gear into and out of a driving connection with the wheel.

In yet another aspect of the present invention, an aircraft with an electric taxi drive system, comprises a landing gear assembly comprising a wheel, comprising a main body, and one or more rollers; the main body comprising a hub portion including a gear end and an attachment end, and a driven gear portion integrally and drivingly connected with the hub portion at the gear end; the driven gear portion comprising a first annular stiff rail and a second annular stiff rail; the one or more rollers rotatingly connected between the first annular stiff rail and a second annular stiff rail; a tire mounted on the hub portion; an electric motor drivingly connected to a driving gear; and an actuator disposed to move the driving gear into and out of a driving connection with the wheel; and an auxiliary power unit electrically connected with the electric motor, to selectively drive the electric motor.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides an aircraft landing gear wheel with a main body including an integral hub portion and driven gear portion which may be used in an aircraft ETS. In general, differences in characteristics of materials in a wheel body and connected driven gear may cause stress at the interface between the wheel body and driven gear with large fluctuations in temperature, or flexing due to movement of the wheel. Although wear as a result of these stresses and the resulting maintenance intervals may have been acceptable in the past, increasing use of ETS systems may make the reduction of these stresses desirous. Reducing the stresses at the interface of a main body of a wheel and a driven gear may result in less wear of the components and longer maintenance intervals.

Figure 1:
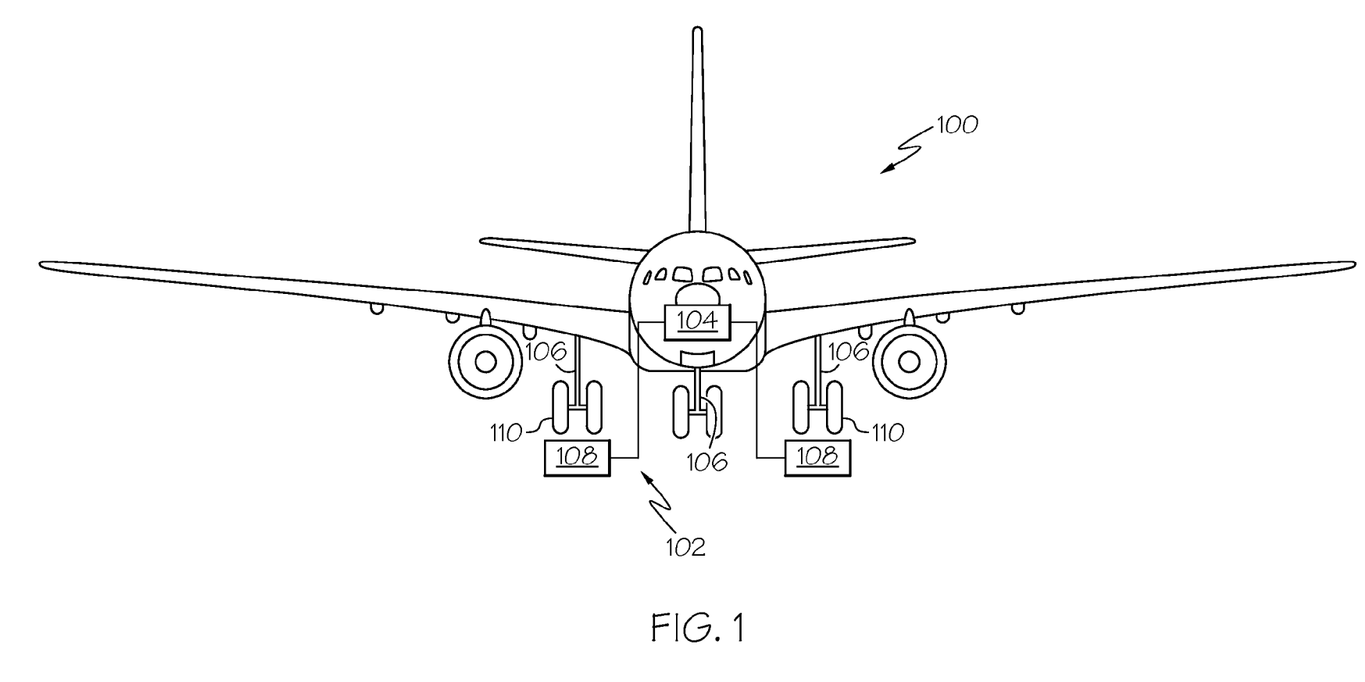
FIG. 1 is a front view of an aircraft with an electric drive taxi system according to an exemplary embodiment of the present invention.

Referring now to FIG. 1, a front view of an exemplary embodiment of an aircraft 100 with an ETS 102 is illustrated. The ETS 102 may provide motive power to the aircraft 100 when the aircraft 100 is taxiing from the gate to the runway, and/or landing to the gate. The aircraft 100 may include one or more landing gear assemblies 106. The ETS 102 may include an APU 104, for example a turbine engine or other internal combustion engine (not shown) for selectively powering the ETS 102. The APU 104 may be selectively electrically connected to one or more electric motor assemblies 108. The one or more motor assemblies 108 selectively drive one or more wheel assemblies 110 on at least one of the landing gear assemblies 106.

Figure 2:
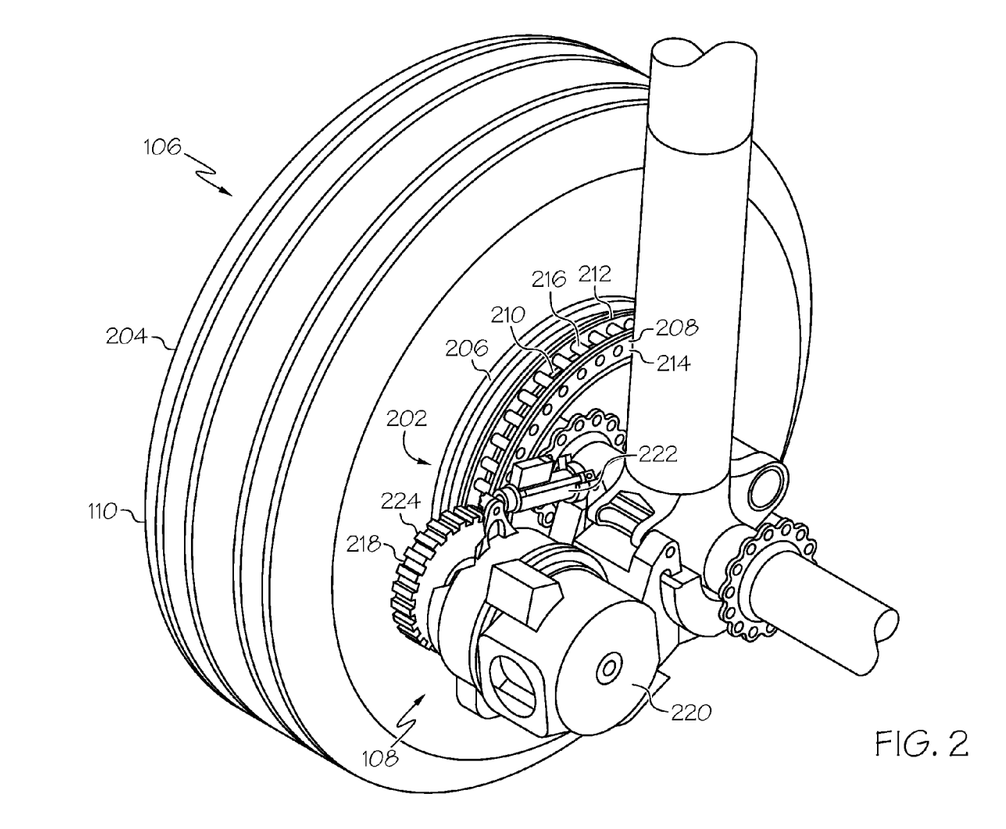
FIG. 2 is a perspective view of a landing gear assembly according to an exemplary embodiment of the present invention.

Referring now to FIG. 2, a perspective view of an exemplary embodiment of the landing gear assembly 106 is illustrated. The landing gear assembly 106 may include the wheel assembly 110, the electric motor assembly 108, and an ETS actuator 222. The wheel assembly 110 may include wheels with an integral driven gear 202 and a tire 204 mounted on a hub portion 302 (shown and described in relation to FIGS. 3A-3F) of a main body 206 of the wheel 202. In some embodiments, the tire 204 may be mounted onto the hub portion 302 with two piece aluminum wheel halves (not shown). However, other methods and apparatus for mounting the tires 204 onto the wheel hubs, as known in the art, may be used. The main body 206 may include a driven gear portion 208 including a first annular stiff rail 212 and a second annular stiff rail 214. One or more rollers 216 may be rotatingly connected between the first annular stiff rail 212 and the second annular stiff rail 214. The wheel 202 will be further described in relation to FIGS. 3A-3F.

The electric motor assembly 108 may include an electric motor 220, and a driving gear 218 including driving gear teeth 224, driven by the electric motor 220. The ETS actuator 222 may selectively move the electric motor assembly 108 into and out of driving connection with the wheel 202. When the electric motor assembly 108 is in driving connection with the wheel 202, the driving gear teeth 224 may mesh with the rollers 216, and the driving gear 218 may drive the wheel 202. When the driving gear teeth 224 mesh with the rollers 216, the driving gear teeth 224 may protrude into spaces 210 between the rollers 216. The electric motor assembly 108 may be brought into driving connection with the wheel 202 when it is desirous for the ETS 102 to provide motive power for the aircraft 100 during taxis.

Figure 3A:
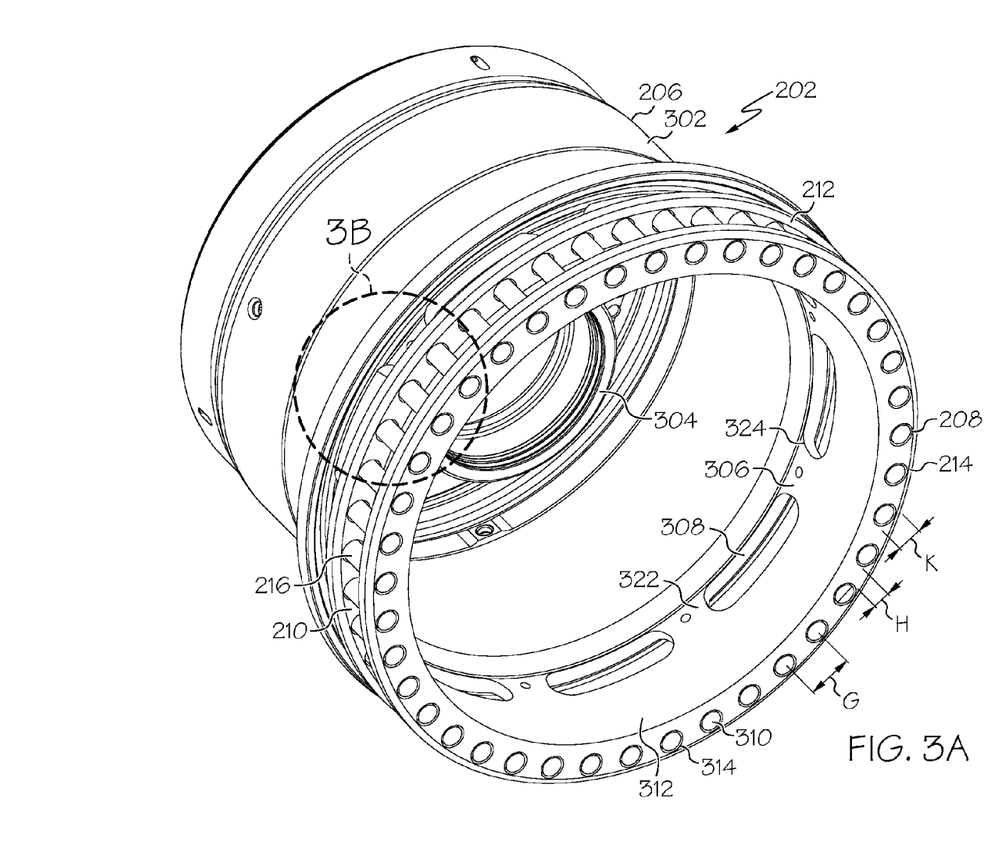
FIG. 3A is a perspective view of a wheel with an integral driven gear according to an exemplary embodiment of the present invention.
Figure 3B:
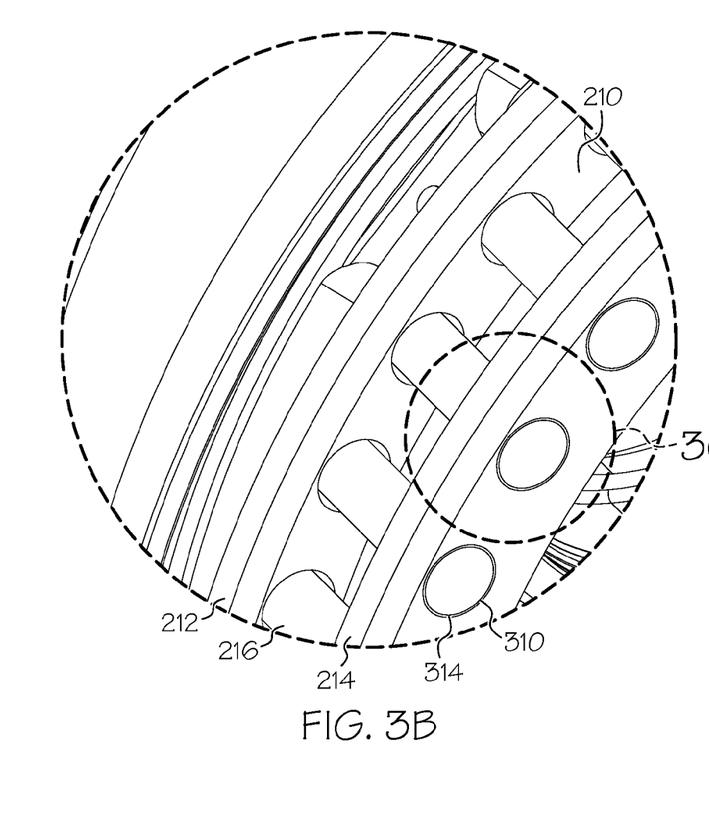
FIG. 3B is a magnified view of a section of the perspective view of the wheel of FIG. 3A in area B.
Figure 3C:
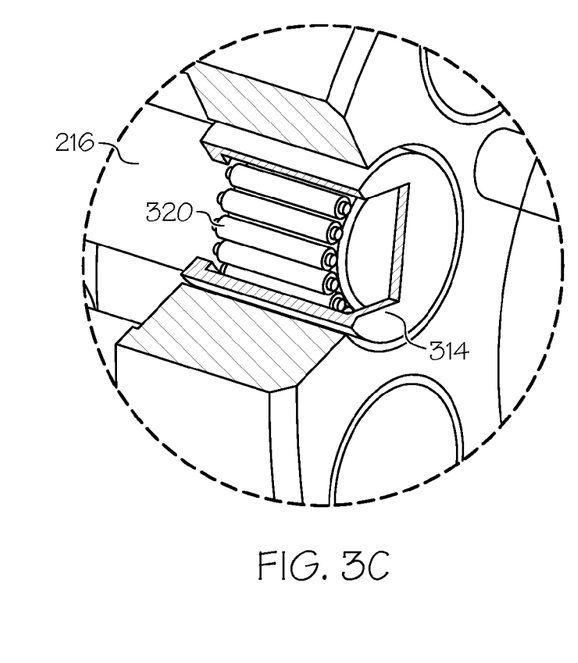
FIG. 3C is a further magnified view of a section of the wheel with an integral driven gear of FIG. 3B.
Figure 3D:
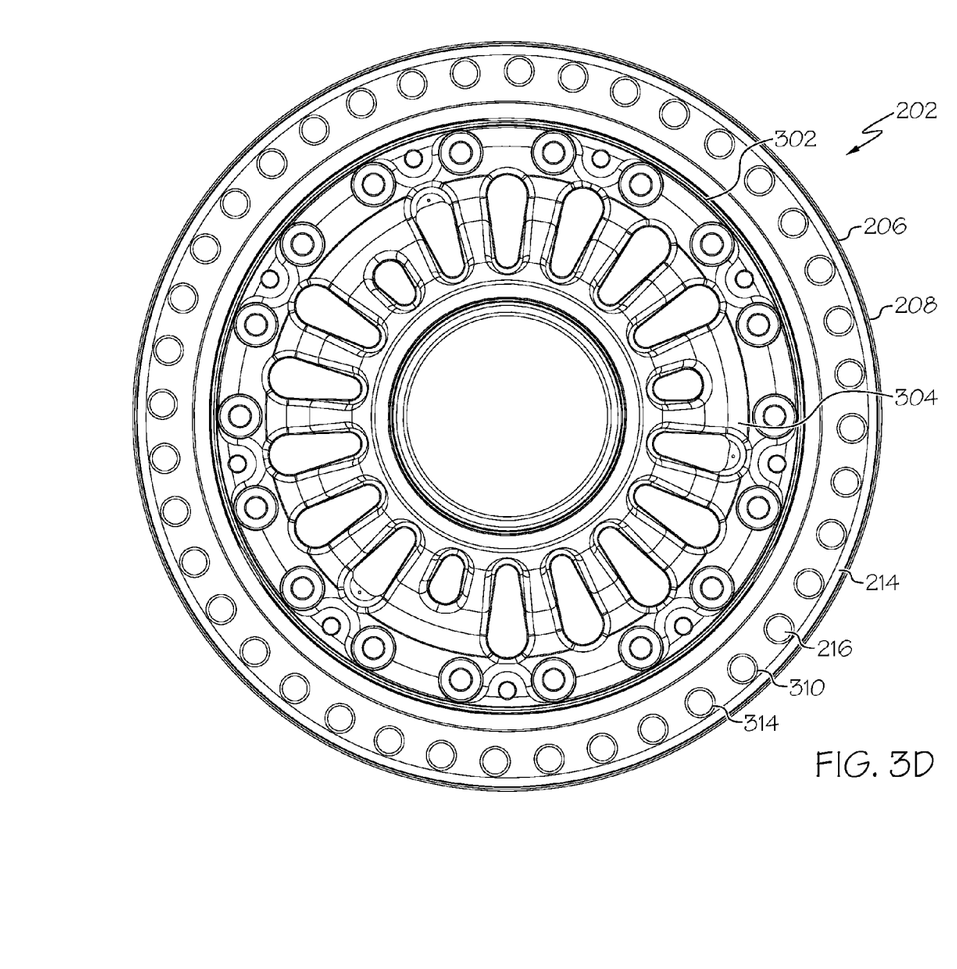
FIG. 3D is a front view of the wheel of FIG. 3A.
Figure 3E:
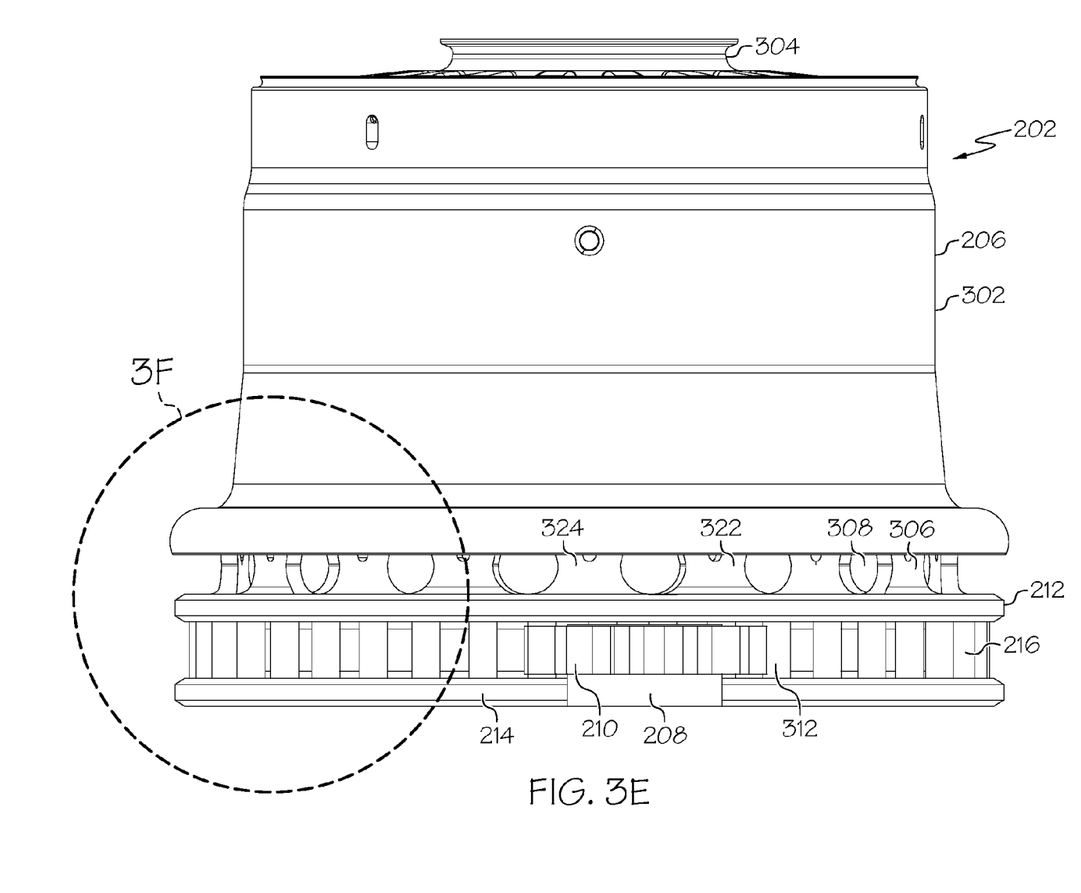
FIG. 3E is a side view of the wheel of FIG. 3A.
Figure 3F:
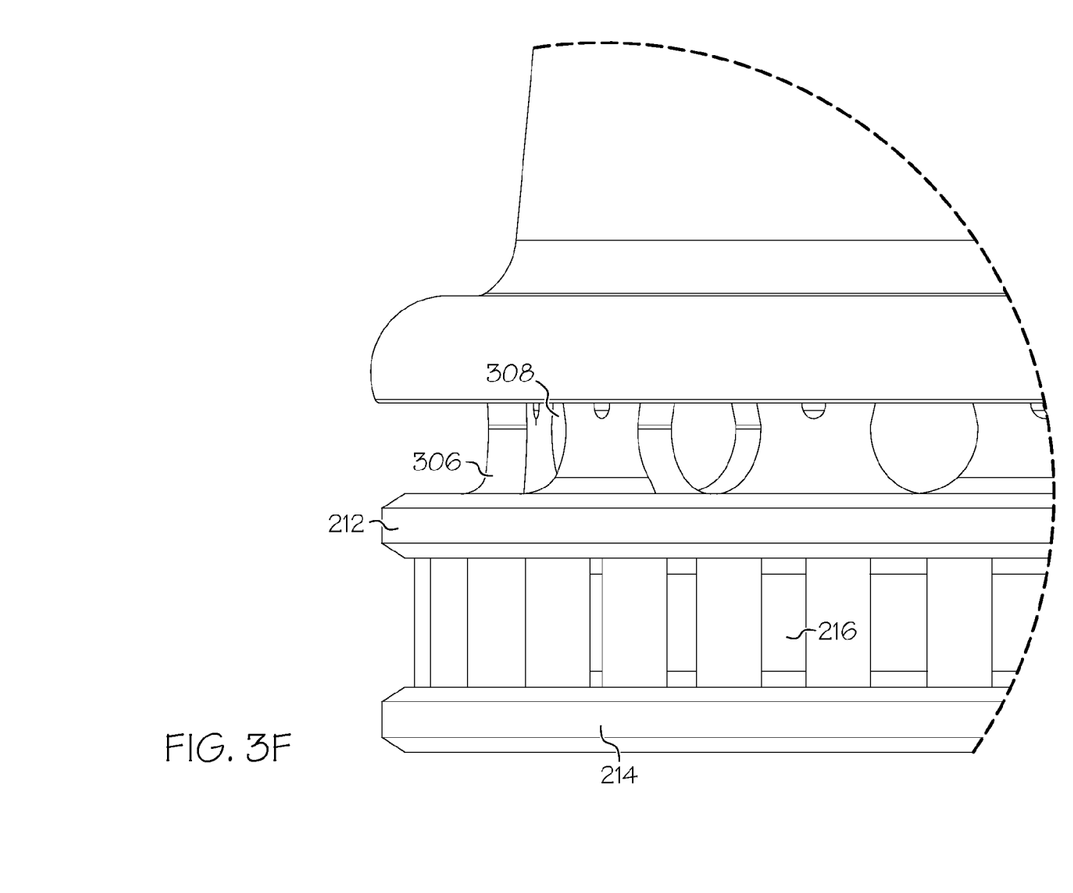
FIG. 3F is a magnified view of a section of the side view of the wheel of FIG. 3E in area F.

Referring now to FIGS. 3A-3F, an exemplary embodiment of the wheel 202 is illustrated. FIG. 3A illustrates a perspective view of the wheel 202, FIG. 3D a front view of the wheel 202, and FIG. 3E a side view of the wheel 202. FIG. 3B illustrates a magnified view of section B of FIG. 3A; FIG. 3C illustrates a magnified view of section C of FIG. 3B; and FIG. 3F illustrates a magnified view of section F of FIG. 3E.

The wheel 202 may include the main body 206. The main body 206 may include the hub portion 302 and the driven gear portion 208. The hub portion 302 may include a gear end 318 and an attachment end 316. The driven gear portion 208 may be integrally and drivingly connected with the hub portion 302 at the gear end 318.

The main body 206 may also include an attachment portion 304 integrally attached to the attachment end 316 of hub portion 302; and an intermediary portion 306 integrally attached between the gear end 316 and the driven gear portion 208. The wheel 202 may be attached to the landing gear assembly at attachment portion 304. The intermediary portion 306 may include one or more weight apertures 308 to lessen the weight of the wheel 202. The intermediary portion 306 may include connecting bars 322 with fillets 324.

The driven gear portion 208 may include a cylindrically shaped driven gear back portion 312, the first annular stiff rail 212 radially extending from the driven gear back portion 312, and the second annular stiff rail 214 radially extending from the driven gear back portion 312. Either or both of the first annular stiff rail 212 and the second annular stiff rail 214 may include one or more roller apertures 310. The roller apertures 310 may be evenly spaced around the circumference of either of both of the first annular stiff rail 212 and the second annular stiff rail 214.

The wheel 202 may include multiple rollers 216 rotatingly connected between the first annular stiff rail 212 and the second annular stiff rail 214. at regular intervals and forming the spaces 210 between them. The rollers 216 may have an elongated cylindrical form with a length, and a cross section of each of the rollers 216 may have a diameter. The rollers 216 may rotatingly connect with the first annular stiff rail 212 and the second annular stiff rail 214 through bearings 314 disposed, at least partially, in the roller apertures 310. In a non-limiting example, the bearings 314 may include needle bearings 320 or other roller bearings. The needle bearings 320 may include small rollers or "needles" between a shell and the roller. In an alternative embodiment a solid bushing, made of low friction material, or any device which will support a rotating shaft or pin may be used in place of the bearings.

The dimensions of the driving gear 218 and driving gear teeth 224 may correspond to the roller 216 length and cross section diameter, the size of the spaces 210 between the rollers 216, and the distance between the first annular stiff rail 212 and the second annular stiff rail 214, such that the driving gear 218 meshes with the rollers 216. The dimensions of the driving gear 218, the driving gear teeth 224, the roller 216 length and cross section diameter, the size of the spaces 210 between the rollers 216, and the distance between the first annular stiff rail 212 and the second annular stiff rail 214 may be designed to ensure that the driving gear 218 and the wheel 202 will not experience stresses which may cause premature wear and damage during torque transfers at expected speeds for expected durations.

The main body 206 may be formed of the same material, which may, in a non-limiting example be an aluminum alloy, and may be forged as one integral component. After forging, the main body 206 may be heat treated, and then may be machined. The rollers 216 and the driving gear 218 may be formed of a steel alloy.

It should be understood, of course, that the foregoing relates to exemplary embodiments of the invention and that modifications may be made without departing from the spirit and scope of the invention as set forth in the following claims.

We claim:

1. An aircraft landing gear wheel, comprising:
   a main body, comprising;
   a hub portion including a gear end and an attachment end;
   a driven gear portion comprising a first annular rail and a second annular rail, the driven gear portion being integrally and drivingly connected with the hub portion at the gear end;
   one or more rollers rotatingly connected between roller apertures of the first annular rail and the second annular rail, and
   bearings rotatingly supporting portions of each of the one or more rollers within the roller apertures.

2. The wheel of claim 1, wherein the main body further comprises an intermediary portion integrally connected to the gear end of the hub portion and the driven gear portion.

3. The wheel of claim 2, wherein the intermediary portion comprises at least one connecting bar.

4. The wheel of claim 3, wherein the at least one connecting bar includes a fillet.

5. The wheel of claim 1, wherein the main body further comprises an attachment portion integrally connected to the attachment end of the hub portion, for attaching the wheel to a landing gear assembly of an aircraft.

6. The wheel of claim 1, wherein the main body is formed using a forging process.

7. The wheel of claim 6, wherein at least a portion the main body is formed with machining.

8. The wheel of claim 1, wherein the main body is formed of an aluminum alloy.

9. The wheel of claim 1, wherein the bearings comprise needle bearings.

10. The wheel of claim 1, wherein:
    the driven gear portion further comprises a driven gear back portion; and
    the first annular rail and the second annular rail radially extend from the gear portion back portion.

11. The wheel of claim 1, wherein the bearings comprise low friction bushings.

12. An aircraft landing gear assembly, comprising:
    a wheel, comprising a main body and one or more rollers; the main body comprising a hub portion including a gear end and an attachment end, and a driven gear portion integrally and drivingly connected with the hub portion at the gear end; the driven gear portion comprising a first annular rail and a second annular rail; the one or more rollers rotatingly connected between the first annular rail and the second annular rail;
    a tire mounted on the hub portion;
    an electric motor assembly including a driving gear, and an electric motor drivingly connected to the driving gear; and
    an actuator disposed to move the driving gear into and out of a driving connection with the wheel,
    wherein the rollers are supported on needle bearings.

13. The landing gear assembly of claim 12, wherein the driving gear is formed of a steel alloy.

14. The landing gear assembly of claim 12, wherein the driving gear comprises driving gear teeth.

15. The landing gear assembly of claim 14, wherein the driving gear teeth mesh with the one or more rollers when the driving gear is in driving connection with the wheel.

16. The landing gear assembly of claim 15, wherein the wheel comprises spaces between the rollers; the driving gear drives the wheel when the driving gear and the wheel are in driving connection; and the driving gear teeth protrude into the spaces as the driving gear drives the wheel.

17. An aircraft with an electric taxi drive system, comprising:
    a landing gear assembly comprising;
    a wheel, comprising a main body and one or more rollers; the main body comprising a hub portion including a gear end and an attachment end, and a driven gear portion integrally and drivingly connected with the hub portion at the gear end; the driven gear portion comprising a first annular rail and a second annular rail; the one or more rollers rotatingly each supported on bearings positioned within apertures of the first annular rail and the second annular rail;
    a tire mounted on the hub portion;
    an electric motor drivingly connected to a driving gear; and
    an actuator disposed to move the driving gear into and out of a driving connection with the wheel; and
    an auxiliary power unit electrically connected with the electric motor, to selectively drive the electric motor.

* * * * *